US 6,545,986 B1

(12) United States Patent
Stellakis

(10) Patent No.: US 6,545,986 B1
(45) Date of Patent: Apr. 8, 2003

(54) CDMA FORWARD LINK POWER CONTROL

(75) Inventor: Haris M. Stellakis, Medford, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/216,034

(22) Filed: Dec. 18, 1998

Related U.S. Application Data

(60) Provisional application No. 60/070,202, filed on Dec. 31, 1997.

(51) Int. Cl.[7] ........................... H04B 7/185; H04B 7/216
(52) U.S. Cl. .................. 370/318; 370/342; 455/522
(58) Field of Search ............................... 370/328, 331, 370/332, 335, 341, 342, 431, 441, 318; 455/522

(56) References Cited

U.S. PATENT DOCUMENTS

| | | | | |
|---|---|---|---|---|
| 5,056,109 A | * | 10/1991 | Gilhousen et al. ............. | 375/1 |
| 5,604,766 A | * | 2/1997 | Dohi et al. .................. | 370/335 |
| 6,137,840 A | * | 10/2000 | Tiedemann, Jr. et al. ... | 375/297 |
| 6,157,668 A | * | 12/2000 | Gilhousen et al. .......... | 375/130 |
| 6,175,745 B1 | * | 1/2001 | Bringby et al. ............. | 455/522 |
| 6,259,927 B1 | * | 7/2001 | Butovitsch et al. ......... | 455/522 |
| 6,304,562 B1 | * | 10/2001 | Kim et al. .................. | 370/332 |

OTHER PUBLICATIONS

TIA/EIA/IS–95A, Mobile Station–Base Station Compatibility Standard for Dual–Mode Wideband Spread Spectrum Cellular System, May 1995.
M. Wallace and R. Walton, "CDMA Radio Network Planning," IEEE ICUPC, Sep. 1994, pp. 62–67.
H. Stellakis and R. Walton, "Forward Link Power Allocation," TIA TR45.5.3.1/95.02.14.09, contribution, Feb. 1995.

* cited by examiner

Primary Examiner—Hassan Kizou
Assistant Examiner—Saba Tsegaye
(74) Attorney, Agent, or Firm—Leonard Charles Suchyta; James K. Weixel

(57) ABSTRACT

A system and method for achieving the optimal transmitted power level relative to noise and interference in a cellular CDMA network. This power control system and method, implemented at the base station in the network, allocates the appropriate power to each mobile user to ensure maintenance of optimal and uniform service quality. A method consistent with the present invention uses a per-frame reporting mechanism based on tracking frame erasure indicator bits to achieve quality cellular service and efficient system operation.

8 Claims, 3 Drawing Sheets

CDMA FORWARD LINK POWER CONTROL

This application claims the benefit of provisional application No. 60/070,202 filed Dec. 31, 1997.

FIELD OF THE INVENTION

The present invention relates generally to wireless communications systems and more particularly to a method for implementing power control at the forward link of a cellular code division multiple access (CDMA) network.

DESCRIPTION OF RELATED ART

A code division multiple access (CDMA) cellular network consists of base stations geographically distributed throughout a service area, and mobile stations. Each base station provides digital telephony service to mobile stations located in the station's designated geographical region. Wireless communications between a mobile station and a base station in a CDMA network organized in accordance with the IS-95 standard from the Telecommunications Industry Association occur on both reverse and forward CDMA channels. The reverse CDMA channel carries traffic and signaling information from the mobile station to the base station. The forward CDMA channel carries traffic and overhead information including pilot, synchronization and paging, from the base station to the mobile station.

Numerous parameters, including mobile velocity, multipath fading and handoff conditions factor into calculating service quality, which is defined by frame error rate ("FER"), for a CDMA network. IS-95A, an Electronic Industries Association standard similar to IS-95, specifies a message-based forward power control protocol for the first-rate set, employing a feedback loop, to report service quality from a mobile station to a base station. In this protocol, the mobile station reports the FER to the base station via a series of periodic blank and burst messages, sent either upon the occurrence of a pre-specified time interval, or when the FER exceeds a predetermined threshold. Upon receipt of an FER report the mobile station must decode the message, thereby realizing a delay, before acting upon it. The delay realized during this processing decreases the accuracy of the reported FER. The combination of periodic reporting and decoding delay prohibit a first-rate set IS-95A-based system from closely tracking service quality.

SUMMARY OF THE INVENTION

Closely tracking service quality is integral to achieving system efficiency. An algorithm that closely tracks service quality permits operation at lower average transmit power than one that tracks poorly because the tracking process allows a system to determine the amount of power needed by each frame, thereby avoiding both waste and over-allocation of transmission power. Consequently, allocation of transmission power to users is equalized and a system may achieve efficiency. Efficient systems operate at higher capacity than do inefficient systems. Thus, a net capacity gain results from close tracking of service quality.

Systems and methods consistent with the present invention address the problem of lost system capacity, allowing a system to operate efficiently, through close tracking of service quality on the forward link of a cellular CDMA system. By applying the optimal amount of power to each frame, a system consistent with the principles of the present invention avoids waste and over-allocation of power to any frame. After determining the optimal transmission power level for a given frame relative to the amount of noise and interference on the cellular link, the current power level is adjusted to reflect the optimal level.

BRIEF DESCRIPTION OF THE DRAWINGS

The accompanying drawings, which are incorporated in and constitute a part of this specification, illustrate embodiments of the invention and, together with the description, explain the principles of the invention. In the drawings.

DETAILED DESCRIPTION

A system consistent with the principles of the present invention increases the efficiency of a cellular CDMA system by applying the optimal amount of power to each frame as it passes from a base station to a mobile station. A power control module consistent with the present invention is used to determine the average and instantaneous frame error rates ("FER"), using them as the basis of a power adjustment. Periodic application of an additional correction factor ensures that the optimal amount of transmission power is applied to each frame.

More specifically, each frame received by the base station contains a frame erasure indicator bit as specified in the IS-95A standard for the second-rate set, indicating the occurrence of a frame erasure. The information conveyed by the frame erasure indicator bit is used to estimate both the average and instantaneous FERs. Based on these estimates, the transmission power is adjusted to the minimum power level needed to achieve both system efficiency and high service quality. Satisfactory service quality occurs when FER ranges from 1–3%.

Figure 1:
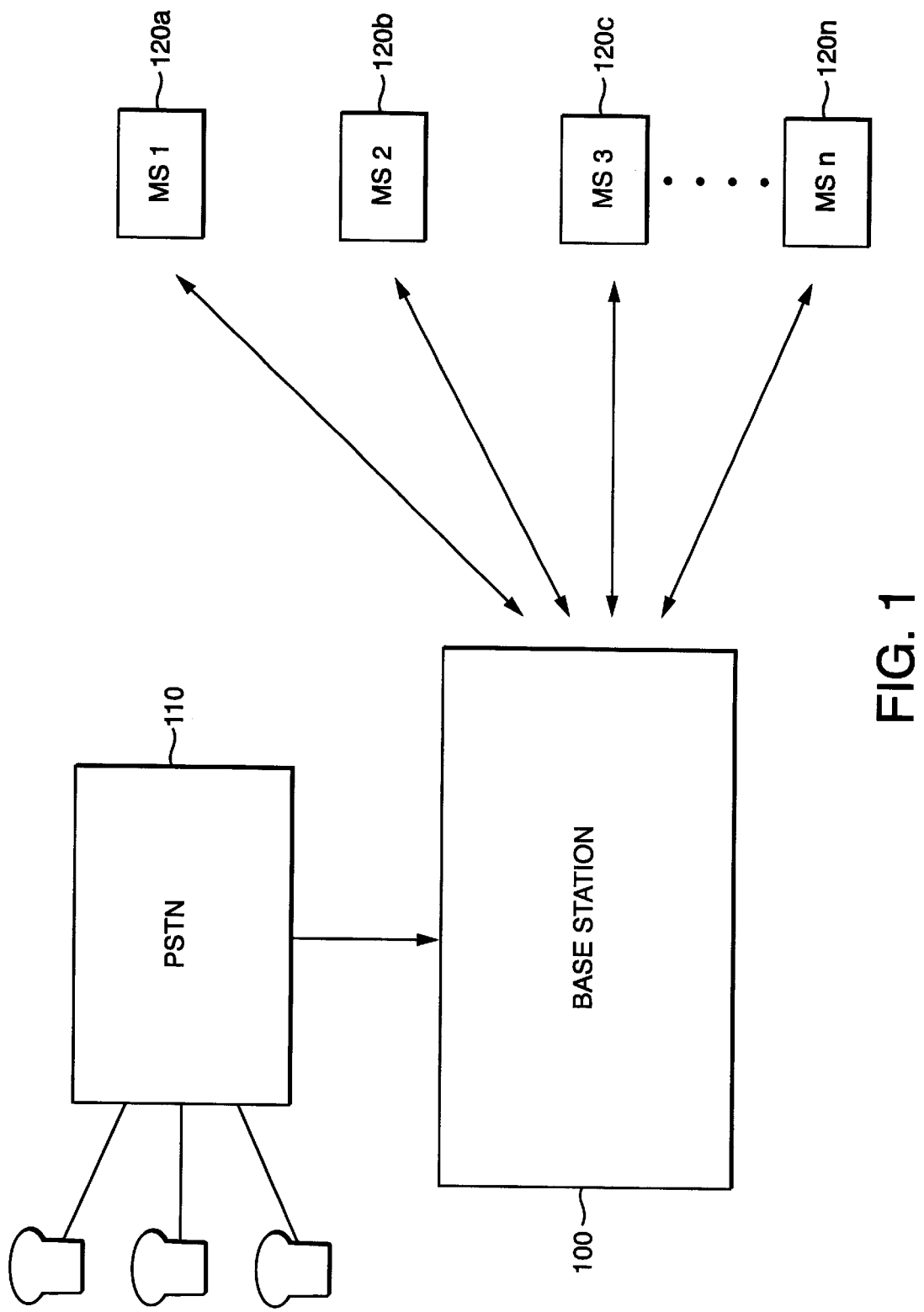
FIG. 1 is a representative diagram of an exemplary digital CDMA cellular network in which systems and methods consistent with the present invention may be implemented.

As shown in FIG. 1, a CDMA system consistent with the present invention contains at least one base station 100 and at least one mobile station 120a . . . n. The base station 100, which may be any base station consistent with the IS-95A standard, is connected to a public switched telephone network 110. A mobile station, for example, station 120a, may be any type of cellular telephone, such as the QCP-820 manufactured by Qualcomm Incorporated, or an equivalent.

Figure 2:
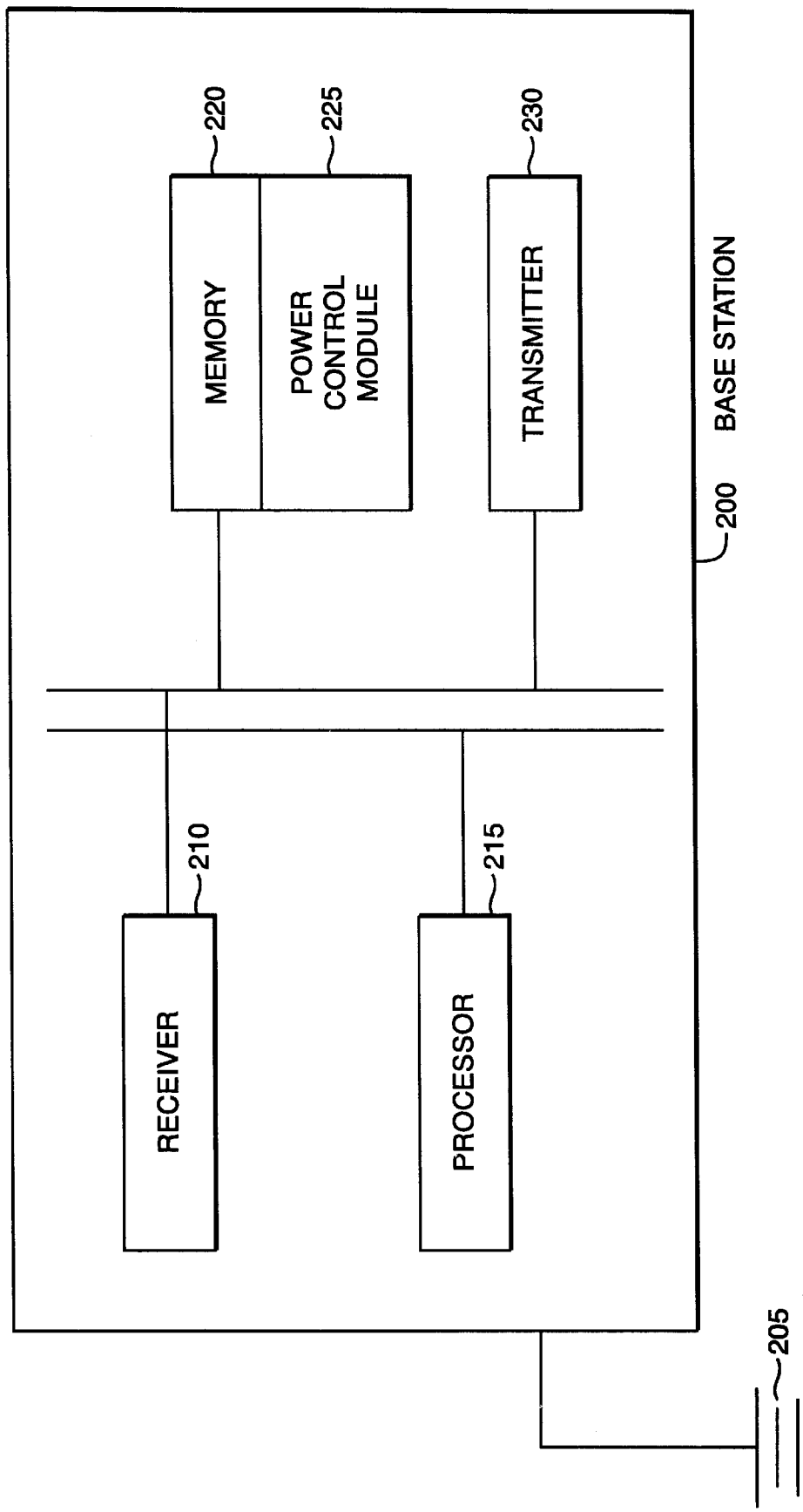
FIG. 2 is a block diagram of a base station consistent with the present invention.

FIG. 2 is a block diagram of the components of a base station 200 consistent with the present invention. Base station 200 is powered by a power supply 205. Base station 200 includes a system bus 240 connecting a receiver 210, a processor 215, a memory 220, and a transmitter 230. Memory 220 includes a power control module 225, which consists of software components written in a high-level programming language, such as C, or in a low-level assembly language. In operation, processor 215 executes the components of module 225 to analyze input frames received by base station 200 via receiver 210. Processor 215 then determines whether it is necessary to adjust the output power level for transmissions from base station 200 and instructs transmitter 230 to output frames in accordance with any power adjustment.

Figure 3:
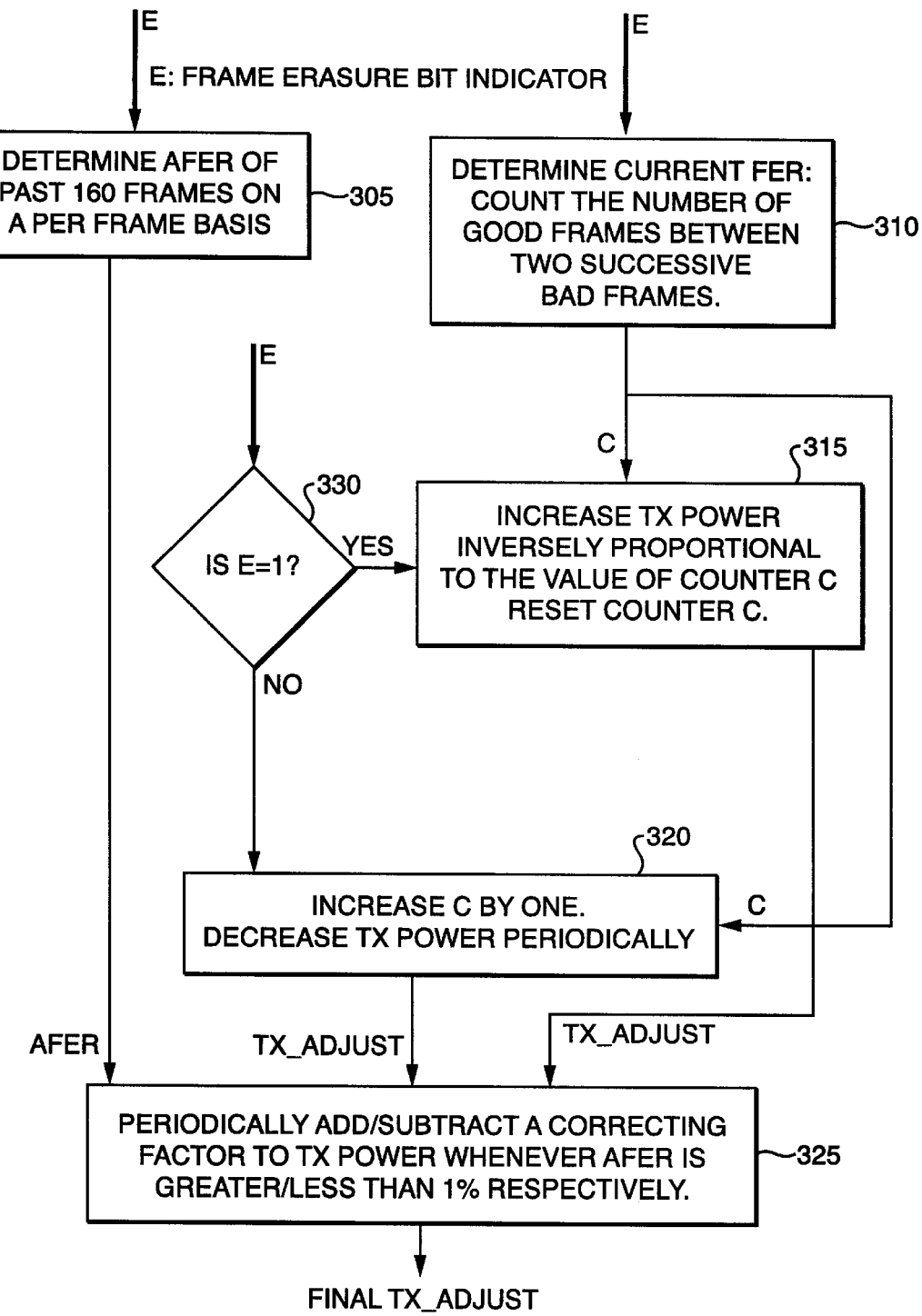
FIG. 3 is a flow chart showing a forward transmission power control method in accordance with the present invention.

FIG. 3 is a dependence diagram illustrating the operation of a base station in a manner consistent with the present invention. Frame erasure bits are tracked by base station 200 in a manner consistent with the principles of the present invention to determine the value of three related metrics, namely, the current FER, the average FER ("AFER") of the past 160 frames, and the occurrence of a frame erasure in each frame. These values are used to adjust, if appropriate, the transmission power for frames transmitted from base station 200. A separate component of module 225 computes each of these values.

The current FER represents the number of good frames between two successive frame erasures, thereby providing an estimate of the operating point of a mobile station 120 on a per-frame basis. The average FER represents the average value of past and present frame erasure indicator bits over a specified time interval. The occurrence of a frame erasure is determined by examining a frame erasure indicator bit contained in each frame.

Component 305 computes the average FER, a performance metric representing the optimal operating point, based on the FER of the past 160 frames.

A counter, C, tracks the number of good frames between successive frame erasures. Component 310 computes the current FER based on the value of the counter C. When the current frame is "good", i.e., a frame erasure indicator bit does not indicate that the current frame contains an error, I/C represents an upper bound on the current FER. On the other hand, when the current frame is "bad", i.e., a frame erasure indicator bit indicates that the current frame contains an error, I/C represents an estimate of the current FER.

Upon the occurrence of a frame erasure the frame erasure indicator bit, E, is set to 1 and step 330 initiates a process, executed by component 315, to gradually increase the transmission power in a manner inversely proportional to the current value of the counter C. The process of component 315 determines the appropriate adjustment of transmission power based on the value of the counter C as shown in Table 1 below. After the transmission power is increased, component 315 resets the counter C to 0.

TABLE 1

| Counter C | Power Adjustment |
|---|---|
| <21 | +4dB |
| 20 < C < 41 | +3dB |
| 40 < C < 71 | +1.5dB |
| 70 < C < 101 | +1.0dB |
| 100 < C < 151 | +2.5dB |
| 150 < C < 200 | +1dB |
| >200 | +3.5dB |

Conversely, each time a good frame is received, E is set to 0 and component 320 increases the counter by one and decreases the transmission power by 0.01 dB. Therefore, a large value of the counter implies a low current FER, while a low counter value implies a high current FER. The lower the value of C, the higher the increase in transmission power to impose. However, a very high increase in transmission power cannot compensate a very low C due to both the loop delay encountered in the communication process and the fading nature of the communication channel.

A high FER implies insufficient received signal strength resulting from low transmission power. Thus, the higher the current FER, the greater the increase in transmission power to impose on the next data frame to reach transmitter 230. Because the communication delay from the time a frame erasure happens at a mobile station 120 to the time it is made known to base station 200 significantly affects the adjustment in transmission power that should be applied to each subsequent frame to reach base station 200, a power control system consistent with the present invention avoids excessive increases in transmission power.

Once the transmission power has been adjusted according to the average and current FERs, a base station operating in a manner consistent with the principles of the present invention may re-adjust the transmission power level if the FER does not fall within the optimal range, generally on the order of 1%. Component 325 periodically re-checks the FER and re-adjusts the transmission power when the FER does not fall within the optimal range. Generally, when the average FER is too high appositive correction factor is imposed according to pre-specified values. Similarly, when the average FER is too low a negative correction factor is imposed.

The correction factor component 325 accepts as input the current FER of each frame received at receiver 210 and analyzes the average FER of the last 160 frames. For example, if the counter is greater than 60 when a specific frame is received, the transmission power will be reduced by 0.05 dB. Similarly, per each 50 frames received, if the average FER of the last 160 frames exceeds 0.9%, the transmission power is increased by 0.8 dB. Tables 2A and 2B below are charts detailing the power re-adjustment according to the correction module 325. A base station consistent with the present invention repeats this process of analyzing, adjusting and re-adjusting the transmission power based on the FER for each frame received.

TABLE 2A

| Counter C | Power Adjustment |
|---|---|
| C > 60 | −0.05dB |
| if C = multiple of 75 | +0.5dB |
| if C = multiple of 50 and C > 99 | +0.5dB |
| if C = multiple of 50 and C > 199 | +1.5dB |

For every 50 Frames received do the following:

TABLE 2B

| AFER | Power Adjustment |
|---|---|
| if AFER > 0.9% | +0.8dB |
| if AFER < 0.4% | −0.3dB |

Ultimately, the amount of transmission power applied to each frame should be as close as possible to the level yielding the target FER because tight coupling between the FER and the transmission power level generally results in both better control of performance and less power needed. However, a transmission power level too low relative to the desired FER increases the probability of many frame erasures occurring over a short period of time. A high FER may be decreased by increasing the transmission power level. However, drastic increases in transmission power ultimately result in wasted transmission power because of the lag time associated with a given frame's ability to realized that power. Further, because a frame can only utilize a maximum amount of power, applying too much transmission power to a frame yields wasted power. Accordingly, because the transmission power applied to one frame reduces the amount of power available for other frames, applying more power to a frame than that frame can use results in a less efficient system and loss of capacity.

Frequent adjustments to the transmission power help maintain optimal transmission power levels, leading to lower and more consistent error rates. Similarly, close tracking of the FER minimizes drastic increases or decreases in error rates because the transmission power is adjusted frequently enough to avoid them.

Although the present invention has been described in connection with exemplary embodiments, many modifications will be readily apparent to those skilled in the art, and are intended to fall within the scope of the appended claims. For example, the various power level adjustments shown in tables 1 and 2 are calculated based on an assumed level of service quality, but other power level adjustments may be appropriate based on a desired service quality. This invention should be limited only by the claims and equivalents thereof.

What is claimed is:

1. A method for controlling a transmission power level for a base station, comprising:

adjusting the transmission power level for a transmission of the base station based on a current frame error rate associated with frames transmitted by the base station;

determining an average frame error rate for a sliding set of frames transmitted by the base station;

re-adjusting the transmission power level for the transmission of the base station based on the determined average frame error rate and the current frame error rate; and repeating the adjusting, determining, and re-adjusting to dynamically adjust the transmission power level for a plurality of transmissions of the base station.

2. The method of claim 1, wherein the sliding set of frames includes a predetermined number of frames previously transmitted by the base station.

3. The method of claim 1, wherein the current frame error rate is based on an indication reflecting a predefined number of good frames identified between two successive frame erasures associated with a plurality of frames previously transmitted by the base station.

4. The method of claim 1, wherein adjusting the transmission power level for the transmission of the base station comprises:

receiving a count value reflecting a number of good frames between successive frame erasures; and adjusting the transmission power level in a manner inversely proportional to the count value.

5. A system for controlling a transmission power level for a base station, comprising:

means for adjusting the transmission power level for a transmission of the base station based on a current frame error rate associated with frames transmitted by the base station;

means for determining an average frame error rate for a sliding set of frames transmitted by the base station;

means for re-adjusting the transmission power level for the transmission of the base station based on the determined average frame error rate and the current frame error rate; and means for repeating the adjusting, determining, and re-adjusting to dynamically adjust the transmission power level for a plurality of transmissions of the base station.

6. The system of claim 5, wherein the sliding set of frames includes a predetermined number of frames previously transmitted by the base station.

7. The system of claim 5, wherein the current frame error rate is based on an indication reflecting a predefined number of good frames identified between two successive frame erasures associated with a plurality of frames previously transmitted by the base station.

8. The system of claim 5, wherein the means for adjusting the transmission power level for the transmission of the base station comprises:

means for receiving a count value reflecting a number of good frames between successive frame erasures; and means for adjusting the transmission power level in a manner inversely proportional to the count value.

\* \* \* \* \*